Figure 5:
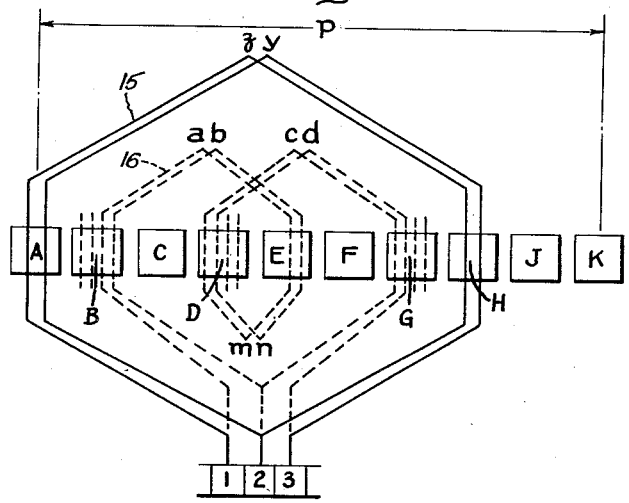

June 30, 1942.  A. C. LANE  2,288,408
ALTERNATING CURRENT COMMUTATOR MACHINE
Filed April 10, 1941    3 Sheets-Sheet 1
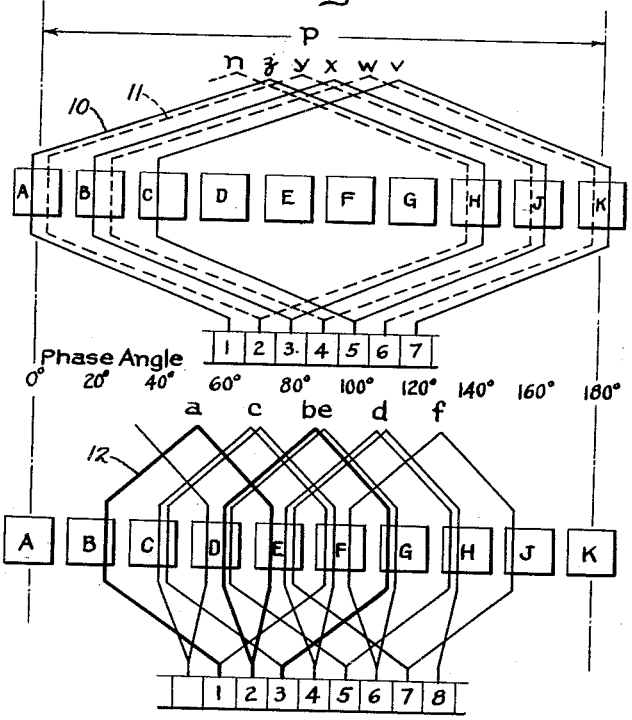
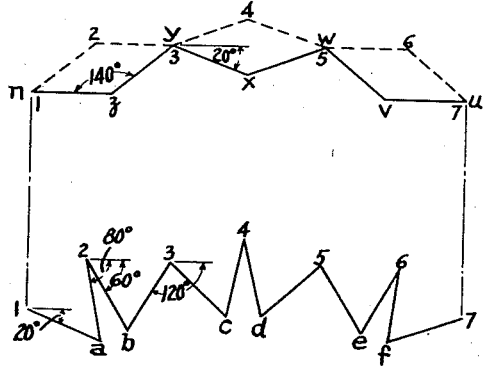
Inventor:
Arthur C. Lane,
by Harry E. Dunham
His Attorney.

June 30, 1942.  A. C. LANE  2,288,408
ALTERNATING CURRENT COMMUTATOR MACHINE
Filed April 10, 1941  3 Sheets-Sheet 2
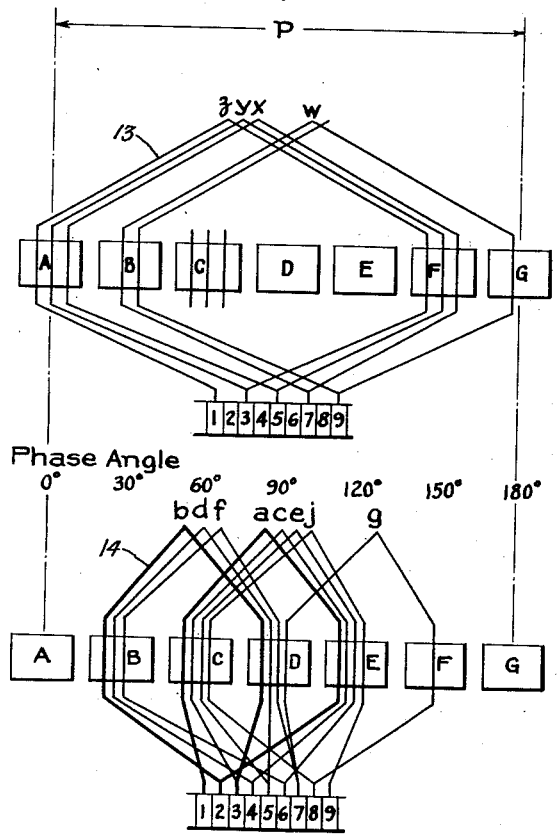
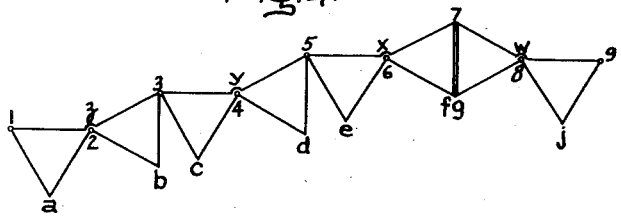
Inventor:
Arthur C. Lane,
by Harry E. Dunham
His Attorney.

June 30, 1942. A. C. LANE 2,288,408
ALTERNATING CURRENT COMMUTATOR MACHINE
Filed April 10, 1941 3 Sheets-Sheet 3

Phase Angle
0°  20°  40°  60°  80°  100°  120°  140°  160°  180°

Inventor:
Arthur C. Lane,
by Harry E. Dunham
His Attorney.

UNITED STATES PATENT OFFICE 2,288,408

ALTERNATING CURRENT COMMUTATOR MACHINE

Arthur C. Lane, Rugby, England, assignor to General Electric Company, a corporation of New York Application April 10, 1941, Serial No. 387,957
In Great Britain April 18, 1940

4 Claims. (Cl. 171—228)

My invention relates to alternating current commutator dynamoelectric machines and in particular to such machines having main and auxiliary commutated windings, the auxiliary winding being provided to improve conditions relating to commutation. The invention herein described may be considered as an improvement and extension of the invention described in application Serial No. 359,120, filed September 30, 1940, by myself and Bernard Adkins, and assigned to the same assignee as the present invention. The application just referred to deals with commutator windings of the duplex type in which equalization of the two halves of a duplex winding of one hundred per cent pitch only is accomplished by means of a short pitched simplex winding of thirty-three and one-third per cent pitch, which is connected in parallel with the main duplex winding of one hundred per cent pitch and which is also wound symmetrically with regard to it. United States Patent 2,143,713, January 10, 1939, deals with the use of an auxiliary winding of high resistance used as a discharge winding for the improvement of commutation of simplex commutator windings.

The present invention avoids the limitation of the above two patent specifications by the employment of what I consider to be a novel arrangement of windings. By the use of my invention an auxiliary winding of the simplex type and of thirty-three and one-third per cent pitch arranged in the special manner as described below may be used for the discharge-resistance effect or voltage-equalizing effect or both, for simplex, duplex, multiplex or half turn windings of any winding pitch whatever.

The purposes of using a winding pitch other than one hundred per cent pitch are:

Firstly, to reduce the voltage between adjacent segments or between alternate segments induced by a given flux, or alternatively for a given voltage to increase the flux.

Secondly, to control the total commutator winding voltage or the voltage between any two points on the commutator as may be necessitated by the design of the motor as a whole.

Thirdly, to displace the coil sides short-circuited by brushes 180° apart when the number of secondary phases is even, so as to make them lie in different slots in order to reduce the reactance voltage of commutation.

Fourthly, for mechanical reasons such as to reduce the length of the end-winding overhanging the core.

The principle of the invention is that in a machine where the flux has a sine wave distribution a coil of thirty-three and one-third per cent pitch has a voltage induced in it of the same magnitude as that induced in a single coil side placed anywhere in the same member of the machine. Further that by suitably positioning the thirty-three and one-third per cent pitched coil in space relative to the single coil side being considered, the phase of its voltage can be made identical with that of the single coil side. Hence any coil side of an armature winding may be duplicated by, discharged by, or equalized by a whole coil of thirty-three and one-third per cent pitch wound in the same member and suitably arranged in space.

Figure 6:
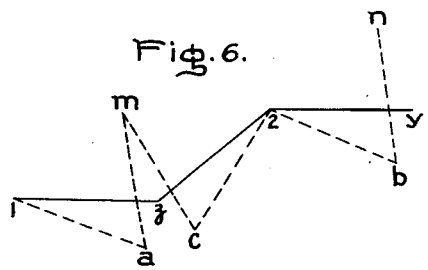
Figure 7:
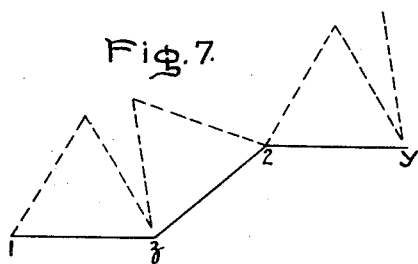

With reference to the following description and to the accompanying drawings the application of the invention is illustrated in three typical cases, namely a short-pitched duplex winding Fig. 1, a short-pitched half-turn winding Fig. 3, and a short-pitched simplex winding Fig. 5. Figs. 2, 4 and 6 are voltage vector diagrams for the windings of Figs. 1, 3 and 5, respectively. Fig. 7 is a voltage vector diagram for a winding such as shown in Fig. 5 with the auxiliary winding displaced one pole.

Fig. 1 in the accompanying drawings represents a duplex winding with forward progression where the average pitch of the duplex winding is 83.3%. A, B, C, etc. represent the slots in a nine-slots-per-pole arrangement. 1, 2, 3, etc. represent the commutator segments, there being two commutator segments per slot. 10 and 11 represent the two halves of the duplex winding and 12 the simplex auxiliary winding. For clarity the duplex and simplex windings are shown separately although in practice the windings are superimposed. Fig. 2 represents in vector form the voltages in the conductors of the windings, and here also those corresponding to the simplex winding are separated from those corresponding to the duplex winding to avoid confusion. Numbers and letters designating commutator segments and end turns in the Figs. 1 and 2 correspond.

It can be seen in the example chosen that the polygon of voltages due to the half duplex winding 10, viz. 1z3x5v7, etc., and the polygon due to the half duplex winding 11, viz., n2y4w6u, etc. exactly correspond at the segments 1, 3, 5, 7 etc. One well known method therefore of coupling the two circuits would be to place equipotential connectors beneath the active core of the rotor joining the points n to 1, y to 3, w to 5, u to 7, etc. The preferred arrangement and my invention is, however, to obviate these equi-potential connectors and instead to effect the coupling by the simplex winding 12. Now in the lower half of Fig. 2 the polygon of voltages for the simplex winding is shown as $1a2b3c4$ etc., and it is seen that the whole number of points 1, 2, 3, 4, etc. corresponding to the segments, coincide exactly with their portions in the duplex winding in the upper half of Fig. 2. Therefore the simplex winding may be superimposed on the duplex winding in the same slots, and in this particular case there will be no out-of-balance voltages in the combined winding such as would cause wasteful circulating currents to flow in the windings. The evolutes $n, y, w, u$, etc. of the duplex winding may therefore be left free of any equi-potential connectors, although such connectors may be included if desired.

It is seen that in order to achieve the desired result, the simplex winding needs to be wound with thirty-three and one-third per cent pitch, but, in an effective manner, first one coil to the left and then one coil to the right of the normal symmetrical position. For example, the total voltage in the whole turn $1-a-2$ must equal in magnitude and direction the voltage in the half turn $n-2$.

In order to construct a duplex winding according to my invention, it is therefore necessary to fulfill the following conditions:

1. The number of slots per pole divided by three shall be integral in order that the short pitch winding may have a winding pitch of thirty-three and one-third per cent.

2. The number of segments divided by the number of slots shall be integral and an even number. Thus in a two-pole machine having a winding such as is shown in Fig. 1 there may be 18 slots and 36 commutator segments.

3. Irrespective of the direction of winding progression the winding pitch of the two halves of the duplex winding shall be different; that is, if $n$ conductors of one half of the duplex winding have a pitch of slots A to N, then $(n-1)$ conductors of the other half of the duplex winding shall have the same pitch of slots A to N, while the remaining conductor shall have a pitch of slots A to $(N+1)$ or A to $(N-1)$.

4. The vector sum of the voltages in the two coil sides of each coil of the thirty-three and one-third per cent pitched winding shall have the same phase angle as that of the voltage vector of the single coil side of the duplex winding which should join the two segments to which the short pitched coil is connected.

A variation of the invention applies more particularly to the "half turn" winding, by which is meant one half only of a true duplex winding. In such a case where there is one circuit instead of two parallel circuits, the section of the one circuit may obviously be increased, thus maintaining high efficiency in the sense of current carrying capacity. In such a case my invention is still less limited in that the number of segments divided by the number of slots while still being integral, may be either an even or an odd number.

Figs. 3 and 4 represent, for example, such a winding making use of my invention, where, for example, the number of slots per pole is six and the number of segments per slot is five. The main winding—the half turn winding—is shown in the upper half of Fig. 3 at 13 and the simplex winding in the lower half of Fig. 3 at 14. The voltage vectors of both windings are shown in Fig. 4. It can be seen that the polygon of voltages due to half turn winding 13, viz.—$1z3y5x7w9$ etc. will line up exactly with the polygon of voltages due to the simplex winding 14, viz.—$1a2b3c4$, etc., at the points 1, 3, 5, 7, etc. The voltages of the intermediate segments 2, 4, 6, 8, etc. are also defined completely by the simplex winding. The use of the simplex winding in this case also does not exclude the use of connectors between the points $z$ to 2, $y$ to 4, $x$ to 6, etc. if these are desired.

A third variation of the invention is illustrated in Figs. 5 and 6 which represent a simplex winding of 77.8 per cent pitch. In Fig. 5 the main simplex winding is shown at 15 and the thirty-three and one-third per cent winding at 16. As in Fig. 1, the segments are shown at 1, 2, 3, etc. there being two segments per slot. The slots are shown at A, B, C, etc. there being nine slots per pole. $z, y$, etc. are the evolutes of the main simplex winding, while $a, b, c$, etc. and $m, n$, etc. are the evolutes of the thirty-three and one-third per cent pitched winding the latter having the off coils in series between adjacent commutator segments. It can be seen from the voltage vector diagram, Fig. 6, that the sum of the voltages $1-z, z-2$, is identical in magnitude and phase to the sum of the voltages $1-a, a-m, m-c, c-2$. The thirty-three and one-third per cent pitched winding 16 may therefore act as a discharge winding for the main winding 15, and there are no unbalanced voltages to cause circulating currents to flow between the two windings.

In the accompanying diagrams, Figs. 1, 3 and 5, coils of the auxiliary winding 12, 14 and 16 are represented as being disposed in the same pole as that in which is placed the coil of the main winding with which they are associated, but it is obviously possible to place the coils of the auxiliary winding in any other pole and still preserve the correct relationship. Fig. 7 illustrates vectorially such an alternative arrangement, the auxiliary winding being in this case disposed in the pole next to the left of that shown in Fig. 5.

As regards the disposition of the two windings in the slots, the thirty-three and one-third per cent pitch winding may occupy the upper portion of the slot near the air-gap and immediately beneath the wedge. Or it may be placed at the bottom of the slot beneath the duplex or half turn winding. It may be further separated from the duplex winding by a separator of magnetic or non-magnetic material, both windings may be wound and disposed in any generally accepted manner, and commutator equalizers and resistance connectors included where desired in any of the well known methods of application. Similarly the auxiliary winding described in my invention may be composed of copper or any higher resistance material.

It is observed that in all of the modifications described each coil of the main winding is connected across a two-coil section of the auxiliary winding at the commutator and that the coils of such two-coil section of the auxiliary winding are off-set from each other in the slots so as to cause the voltage of the main and auxiliary winding sections connected across the same commutator segments to be equal and in phase. Thus, in Fig. 1, coil 10 of the main winding is connected across segments 1 and 3 in parallel with the two-coil section of the auxiliary winding, the middle point of which is connected to segment 2 and the two coils of such section of the auxiliary winding are offset from each other in the slots to cause the voltage thereof across segments 1 and 3 to be equal and in phase with the voltage of the main coil connected across the same segments.

What I claim as new and desire to secure by Letters Patent of the United States, is:

1. An alternating current dynamoelectric machine having a slotted core and a commutator, a main winding of less than 100 per cent pitch having coils connected to said commutator, an auxiliary winding of 33⅓ per cent pitch also connected to said commutator, said windings being contained in the slots of the core and the machine having a sine wave flux distribution, each coil of the main winding being connected across the same commutator segments as a two-coil section of the auxiliary winding, the two coils of such section of the auxiliary winding being offset from each other in different slots such that the voltages of the main and auxiliary winding parts connected across the same segments are equal and in phase.

2. An alternating current dynamoelectric machine having a slotted core and a commutator, a main winding of less than 100 per cent pitch having coils connected across alternate segments of such commutator, an auxiliary winding of 33⅓ per cent pitch having coils connected across adjacent segments of such commutator, said windings being contained in the slots of the core and the machine having a sine wave flux distribution, each coil of the main winding being connected across the same commutator segments as a two-coil section of the auxiliary winding, the two coils of such section of the auxiliary winding being offset from each other in different slots such that the voltage of the main and auxiliary winding parts connected across the same segments are equal and in phase.

3. An alternating current dynamoelectric machine having a slotted core and a commutator, a main winding of less than 100 per cent pitch having coils connected across alternate segments of such commutator, an auxiliary winding of 33⅓ per cent pitch having coils connected across adjacent segments of such commutator, said windings being contained in the slots of the core and the machine having a sine wave flux distribution, each coil of the main winding being connected across the same commutator segments as a two-coil section of the auxiliary winding, the two coils of such section of the auxiliary winding being offset from each other in different slots such that the voltage of the main and auxiliary winding parts connected across the same segments are equal and in phase; the mid-point of such two-coil auxiliary winding section being connected to an intermediate segment and such auxiliary winding coils forming parts of other adjacent similar such two-coil winding sections and the intermediate segment a terminal for other adjacent main coils.

4. An alternating current dynamoelectric machine having a slotted core and a commutator, a main winding of less than 100 per cent pitch having coils connected across adjacent commutator segments, an auxiliary winding having coils of one third full pitch and having two coils in series connected across adjacent commutator segments, said coils being contained in the slots of the core and the machine having a sine wave flux distribution, the two coils of the auxiliary winding which are connected across adjacent commutator segments being displaced from each other in the slots to cause the voltages of the main and auxiliary windings which are connected across adjacent commutator segments to be equal and in phase.

ARTHUR C. LANE.